United States Patent [19]

Ridenour

[11] Patent Number: 5,164,162

[45] Date of Patent: Nov. 17, 1992

[54] MIXING HEAD WITH SLEEVED QUIETING CHAMBER

[75] Inventor: Harold S. Ridenour, Akron, Ohio

[73] Assignee: The Dow Chemical Company, Midland, Mich.

[21] Appl. No.: 526,864

[22] Filed: May 21, 1990

[51] Int. Cl.$^5$ .......................... C08F 2/00; B28B 1/50; B01F 5/04

[52] U.S. Cl. .................... 422/131; 422/133; 425/4 C; 425/4 R; 366/173; 137/883; 137/885

[58] Field of Search ............... 422/131, 133; 425/4 R, 425/4 C; 366/137, 173, 182; 521/82, 99; 137/883, 885

[56] References Cited

U.S. PATENT DOCUMENTS

| | | | |
|---|---|---|---|
| 3,220,801 | 11/1965 | Rill, Jr. et al. | 422/133 |
| 3,222,134 | 12/1965 | Peterson | 422/133 |
| 3,773,298 | 11/1973 | Gebert | 422/133 X |
| 3,799,199 | 3/1974 | Rumpff | 422/133 X |
| 3,902,850 | 9/1975 | Lehnert | 422/133 |
| 4,082,512 | 4/1978 | Wingard et al. | 422/240 |
| 4,189,070 | 2/1980 | Macosko et al. | 222/134 |
| 4,226,543 | 10/1980 | Schluter | 366/159 |
| 4,452,919 | 6/1984 | Schneider | 422/133 X |
| 4,600,312 | 7/1986 | Scrivo | 366/159 |
| 4,671,942 | 6/1987 | Dietachmair | 422/133 |
| 4,695,433 | 9/1987 | Scrivo et al. | 422/112 |
| 4,726,933 | 2/1988 | Mayr et al. | 422/133 |
| 4,740,089 | 4/1988 | Fiorentini | 422/133 |
| 4,840,556 | 6/1989 | Reilly et al. | 425/543 |
| 4,856,908 | 8/1989 | Hara et al. | 366/182 |
| 4,876,071 | 10/1989 | Toda et al. | 422/133 |

FOREIGN PATENT DOCUMENTS

| | | | |
|---|---|---|---|
| 2090763 | 7/1982 | United Kingdom | 422/133 |
| 8702270 | 4/1987 | World Int. Prop. O. | 422/133 |

Primary Examiner—James C. Housel
Assistant Examiner—William Chan

[57] ABSTRACT

An L-shaped mixing head for reaction injection molding apparatus comprises a first chamber wherein a plurality of reactive molding components are impingement mixed under high pressure. A second chamber intersecting with the first chamber quiets the resulting stream of mix product prior to its exiting the mixing head. The outlet end of the second chamber is defined by the inner surface of a sleeve, the material of which has a yield strength less than that of the materials of the mixing head body and the second plunger. Most preferably, the sleeve material is also chemically nonreactive with and nonadherent to the reactive molding components to be used therewith, both individually and as mixed.

13 Claims, 1 Drawing Sheet

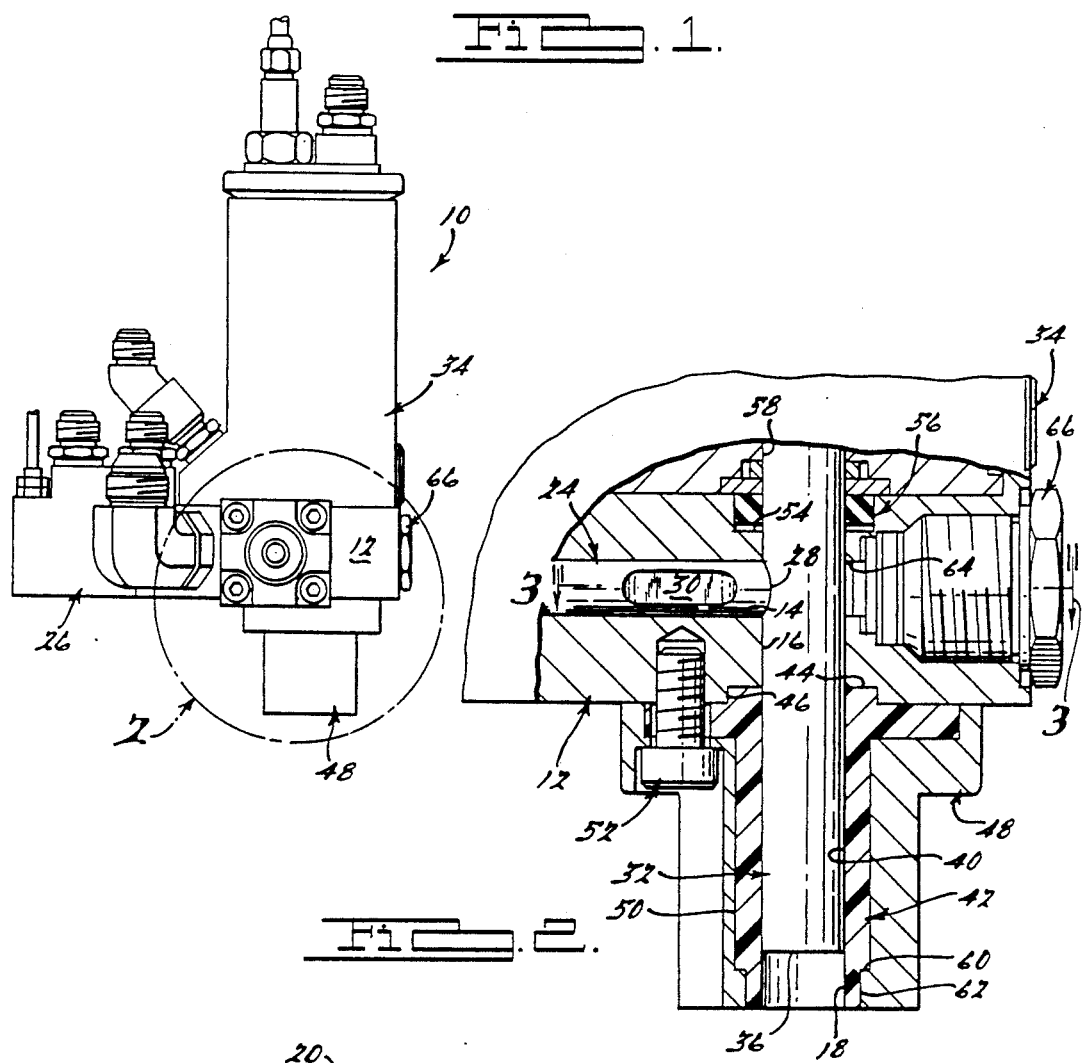
Fig. 1.
Fig. 2.
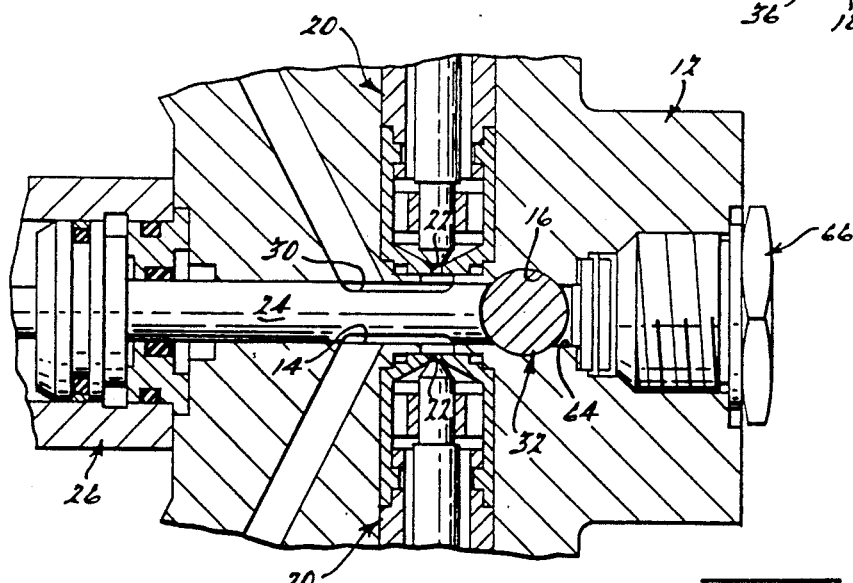
Fig. 3.

MIXING HEAD WITH SLEEVED QUIETING CHAMBER

BACKGROUND OF THE INVENTION

The instant invention relates to L-shaped mixing heads used in reaction injection molding (RIM) apparatus for combining a plurality of reactive molding components prior to their delivery into a mold. These reactive molding components typically comprise a polyahl and an isocyanate moiety, as those terms are used and described in U.S. Pat. No. 4,390,645 to Hoffman et al, which disclosure is hereby incorporated herein by reference.

The prior art teaches L-shaped RIM mixing heads, or "L-heads", comprising a body with a first bore wherein reactive molding components are impingement mixed; and a second bore intersecting the first bore into which the resulting mix product is ejected upon reciprocation of a plunger within the first bore. The second bore, which is typically of substantially greater diameter than the first bore, defines a "quieting chamber" wherein the velocity of the mix product stream is significantly abated prior to exiting the mixing head. The length of the quieting chamber is calculated, for example, so as to obtain splashless pours into an open mold. A plunger is reciprocated within the second bore at the end of the "shot" to eject remaining mix product from the quieting chamber.

One problem associated with known L-heads is the adherence and subsequent accretion of reactive molding components, either individually or as mixed, to the walls of the quieting chamber. The accreted material tends to radially deflect the second plunger as it reciprocates within the quieting chamber, with an attendant increase in the amount of friction generated between the plunger and the chamber walls. Such increased frictional contact frequently results in the galling of either the plunger or the chamber walls, or both of them, and the ultimate fracture of the plunger is not uncommon. The likelihood of galling is further increased by the length of the quieting chamber demanded by certain high-volume RIM applications.

Should the surface of the plunger become galled, its continued reciprocation past the lip seal of the plunger's hydraulic actuator results in the rapid deterioration of the lip seal and the subsequent contamination of the mix product/molded part with hydraulic fluid. The radial deflection of the plunger also permits reactive material to flow upstream to pack the lip seal, thereby reducing lip seal effectiveness and further encouraging the breach thereof.

The accretion of reactive material on the walls of the quieting chamber further provides increased resistance to plunger reciprocation, whereby mixing head cycling time is increased and part production slowed.

The prior art has heretofore approached the problem of material accretion on the walls of the quieting chamber by specifying closer tolerances for both plunger and bore to reduce the radial gap therebetween. This in turn reduces the amount of material which is able to accrete on the walls prior to being scraped therefrom by the free end of the plunger. While this approach succeeds in increasing the useful life of the plunger and the mixing head body, the closer plunger and bore tolerances required by this approach significantly increase the machining costs associated with those parts, particularly given the length of the quieting chamber required for some applications; and this approach nonetheless relies upon the periodic, albeit less frequent, replacement of the plunger and/or the mixing head body. Thus, this approach results not only in a substantial increase in the cost of mixing head parts but also fails to satisfactorily eliminate the costly production downtime accompanying their ultimate replacement.

The addition of fillers to the mix product further reduces the effectiveness of the prior art approach. Specifically, the passage of filled or "reinforced" mix product through the quieting chamber abrades both the chamber walls and the tip of the plunger. As a result, increasingly less reliance may be had over time on the close fit between the plunger and the bore, and the scraping action of the plunger tip against the bore, to prevent the deleterious accretion of reactive material upon the walls of the quieting chamber.

Another problem encountered with known L-heads is their susceptibility to failure due to misalignment of a plunger with its corresponding bore within the mixing head body. Known mixing heads typically employ hydraulic actuators for reciprocating the first and second plungers in their respective bores. The hydraulic actuators are normally bolted onto the mixing head body so as to facilitate replacement of any given part. Each hydraulic actuator and, hence, the plunger reciprocated thereby are vulnerable to misalignment with their corresponding bore in the mixing head body as a result of either the improper mating of the hydraulic cylinder with the mixing head body, or the mishandling of the mixing head on the shop floor. Still further, the substantial stroke of the second plunger required to clear the quieting chamber of reactive material at the end of each shot amplifies the effect of any plunger-to-bore misalignment, thereby increasing the likelihood of mixing head failure due to galling or seizing of the plunger within the second bore.

The prior art approach is once again the specification of closer tolerances for the mating surfaces, with the increased machining costs associated therewith, to ensure the proper alignment of actuator and bore upon initial mating of each hydraulic actuator with the mixing head body. The problem of subsequent misalignment of plunger and bore on the shop floor has heretofore remained unresolved.

SUMMARY OF THE INVENTION

It is an object of the instant invention to provide an improved L-shaped mixing head for reaction injection molding apparatus which overcomes the problem of the deleterious accretion of reactive molding components, either individually or as mixed, on the walls of the quieting chamber thereof while obviating the need for closely toleranced mixing head parts.

Another object of the instant invention is to provide an L-head exhibiting less susceptibility to failure due to misalignment of the second bore and the plunger reciprocated therein.

A further object of the instant invention is to provide an L-head featuring reduced metal-to-metal contact between the second plunger and the bore defining the quieting chamber therein.

Yet another object of the instant invention is to provide an L-head having a quieting chamber, the replacement of a substantial portion of which may be effected with minimal production downtime.

An L-shaped mixing head for RIM apparatus according to the instant invention comprises a metal body having a first bore therein defining a cylindrical mixing chamber. A second bore in the body intersects the first bore therein to define a first portion of a cylindrical quieting chamber, which chamber has an outlet end forming the discharge nozzle of the mixing head. A plurality of injection nozzles are attached to the metal body so as to place the metering orifices thereof in communication with the mixing chamber therein.

A first metal plunger is controllably reciprocable in the first bore between a retracted position wherein its free end is withdrawn past the injection nozzles to permit the injection of reactive molding components into the mixing chamber, and an extended position wherein the first plunger blocks the injection nozzles while its free end ejects the injected components from the mixing chamber into the quieting chamber. Similarly, a second metal plunger is controllably reciprocable in the second bore between a retracted position wherein its free end is withdrawn past the intersection of the first bore with the second bore to permit the flow of injected components from the mixing chamber into the quieting chamber, and an extended position wherein the second plunger blocks the first bore while its free end ejects the injected components in the quieting chamber out the outlet end thereof.

According to the instant invention, a longitudinal portion of the quieting chamber proximate to the outlet end thereof is defined by the inner surface of a sacrificial sleeve fixedly attached to the mixing head body. The sacrificial sleeve is formed of a material having a yield strength less than that of the materials of the mixing head body and the second plunger but having sufficient strength to prevent axial cold flow thereof during reciprocation of the second plunger within the sleeve. For example, where the mixing head body and the second plunger are fabricated from steel, the sleeve is preferably formed of a material such as a tough polymer having a yield strength in the range between about 5,000 psi and about 20,000 psi; a nonexternally-lubricated coefficient of friction with respect to the material of the second plunger of less than about 0.25; and a notched impact strength of greater than about 0.5 ft-lbs, as measured with the Charpy test. Thus, while the wall of the second bore within the metal mixing head body forms a nonyieldable bearing surface for the second plunger, the inner surface of the sacrificial sleeve yields to the second plunger as it extends therethrough, whereby deleterious contact between the second plunger and the walls of the quieting chamber is virtually eliminated.

Additionally, the material of the sleeve is preferably chemically nonreactive with and nonadherent to the reactive molding components injected into the mixing chamber, either individually or as mixed, whereby the deleterious accretion of reactive material on the walls of the quieting chamber is substantially avoided.

In a preferred embodiment of the instant RIM mixing head, the outlet end of the sleeve is encompassed by an annular metallic nozzle member which is attached as by threaded fasteners to the mixing head body. The nozzle member provides radial support for the outlet end of the sleeve while further serving to protect the sleeve from accidental impacts. The other end of the sleeve is seated in a counterbored portion of the second bore to ensure concentricity therewith. Where the sleeve material is relatively soft and, hence, exhibits a tendency to axially cold flow during reciprocation of the second plunger within the sleeve, the sleeve is axially supported by a radially-inward annular flange on the nozzle member.

The mixing head of the instant invention obviates the need for a highly toleranced second bore while resolving the excessive friction and galling problems heretofore encountered with known L-heads. Moreover, the sleeve accommodates minor bore-plunger misalignment through the radial yielding of the material thereof. And, should the sleeve require replacement, as might be periodically required where the mixing head is used in combination with an abrasive filler, the sleeve is easily replaced and its relatively lower yield strength obviates the need for the precise matching of plunger and bore heretofore required with metallic mixing head parts.

BRIEF DESCRIPTION OF THE DRAWINGS

FIG. 1 is an elevational view of an L-shaped RIM mixing head constructed in accordance with the instant invention;

FIG. 2 is an exploded elevational view, partly broken away, of the L-head shown in FIG. 1 within circle 2 thereof showing its sleeved quieting chamber; and FIG. 3 is a view in cross-section of the L-head shown in FIG. 2 along line 3—3 thereof showing the location of its injection nozzles relative to its mixing and quieting chambers, respectively.

DETAILED DESCRIPTION OF THE PREFERRED EMBODIMENT OF THE INVENTION

Referring to the drawings, an exemplary L-shaped RIM mixing head 10 according to the instant invention comprises a metal body 12 having a first bore 14 therein, a portion of which defines an elongated mixing chamber. A second bore 16 in the body 12 intersects the first bore 14 at an end thereof. A longitudinal portion of the second bore 16 defines a first portion of an elongated quieting chamber, which chamber has an outlet end 18 forming the discharge nozzle of the mixing head 10. A pair of injection nozzles 20 are attached to the mixing head body 12 so as to place the metering orifices 22 thereof in communication with the mixing chamber.

A first plunger 24 received in the first bore 14 and having a surface complementary thereto is movable within the first bore 14 along its longitudinal axis. The first plunger 24 is reciprocated within the first bore 14 by a first hydraulic actuator 26 between a retracted position wherein its free end 28 is withdrawn past the injection nozzle orifices 22 to permit reactive molding components to be injected through the orifices 22 into the mixing chamber, and an extended position wherein the first plunger 24 blocks the injection nozzle orifices 22 while the plunger's free end 28 ejects the mix product from the mixing chamber into the quieting chamber. The first plunger 24 is provided with longitudinal grooves 30 to permit the recirculation of the individual reactive molding components when the first plunger 24 is in its extended position.

A second plunger 32 received in the second bore 16 and having a surface complementary thereto is moveable within the second bore 16 along its longitudinal axis. A second hydraulic actuator 34 reciprocates the second plunger 32 between a retracted position wherein the plunger's free end 36 is withdrawn past the intersection of the first bore 14 with the second bore 16 to permit the flow of mix product from the mixing chamber into the quieting chamber, and an extended position wherein the second plunger 32 blocks the first bore 14 while the plunger's free end 36 ejects the mix product from the quieting chamber out the outlet end 18 thereof.

As seen in FIG. 2, the portion of the quieting chamber proximate to the outlet end 18 thereof is defined by the inner surface 40 of a sleeve 42 fixedly attached to the mixing head body 12. Specifically, one end 44 of the sleeve 42 is seated in a counterbored portion 46 of the second bore 16 to ensure concentricity therewith. An annular metallic nozzle member 48 encompasses the remaining length 50 of the sleeve 42 proximate to the outlet end 18 of the quieting chamber to provide radial support and protection therefor. A fastener 52 prevents rotation of the sleeve 42 relative to the mixing head body 12.

The sleeve 42 is formed of a material having a yield strength below that of the material of both the mixing head body 12 and the second plunger 32, respectively. As such, the material of the sleeve 42 yields, i.e., plastically deforms, in response to pressures or contacts from misalignment of the second plunger 32 with the inner surface 40 of the sleeve 42, whether the misalignment is the result of the improper mating of the plunger's hydraulic actuator 34 to the mixing head body 12 or the mishandling of the mixing head 10 on the shop floor. Stated another way, while the second bore 16 in the mixing head body 12 forms a nonyielding bearing surface for the second plunger 32, the inner surface 40 of the sleeve 42 forms a yieldable bearing surface for the second plunger 32 as it extends therethrough. In this manner, the sleeve 42 accommodates or "forgives" modest plunger-to-sleeve misalignment while overcoming the galling problem characteristic of prior art mixing heads. The lower limit on the yield strength of the sleeve material is calculated in a manner known to one skilled in the art so as to avoid axial yielding thereof in response to normal reciprocation of the second plunger 32 within the sleeve 42.

For example, where the mixing head body 12 and the second plunger 32 are fabricated from hardened steel, the sleeve material most preferably exhibits a yield strength in the range between about 5,000 psi and about 20,000 psi; a dynamic coefficient of friction in combination with the material of the second plunger 32 of less than about 0.25; and an impact strength greater than about 0.5 ft-lbs, as measured by the Charpy test. A modulus of elasticity less than about 1,000,000 psi, a percent elongation at yield no greater than about 10 percent, and a maximum continuous use temperature of greater than about 200° F. are also preferred.

An exemplary sleeve material is a Type 6 cast polyamide sold by Erta Incorporated of Exton, Pennsylvania, under the tradename "ERTALON LFX". As reported by its manufacturer, "ERTALON LFX" has a yield strength of 10,200 psi; a nonexternally-lubricated dynamic coefficient of friction on steel between about 0.15 and about 0.25; a notched impact strength of 0.50 ft-lbs, as measured by the Charpy test; a modulus of elasticity of 410,000 psi; a percent elongation at yield of 5 percent; and a maximum continuous use temperature of 210° F. "ERTALON LFX" also exhibits excellent machinability.

Preferably, the material of the sleeve 42 is also chemically nonreactive with and nonadherent to the individual reactive molding components injected into the mixing chamber and mixtures thereof. By "chemically nonreactive", it is meant that the material of the sleeve 42 does not chemically react with the reactive material passing therethrough to any significant degree. Most preferably, the sleeve material exhibits no more than a 2 percent change in weight or volume when exposed for up to a 14 day period to the reactive molding components to be used with the sleeve 42, both individually and as mixed. By "nonadherent", it is meant that the individual reactive molding components and mixtures thereof do not form an adherent film build-up on the surface 40 of the sleeve 42 or that any such film which may undesirably form as by frictional effects is otherwise readily dislodged from the sleeve surface 40 by reciprocation of the second plunger 32.

The preferred sleeve material "ERTALON LFX" is chemically nonreactive with chemicals used in the polyurethane process, as well as hydrocarbon-based oils as might be utilized in the hydraulic actuators 26 and 34 of the instant mixing head 10. The following percent changes in weight of "ERTALON LFX" were observed when a sample thereof was exposed for a 14 day period to the three representative chemicals:

| Chemical | Percent Change in Weight of ERTALON LFX |
| --- | --- |
| Spectrim 50BS | +1.18 |
| XVS-15081.001/A1100 @ 130° F. | −0.03 |
| Kerosene | +0.17 |

Thus, with the instant mixing head 10, reactive material is unable to accrete upon the surface 40 of the sleeve 42 and, hence, the second plunger 32 remains substantially aligned with the second bore 16 and increased frictional contact between the two is avoided. In the event of misalignment of the second plunger 32 with the second bore 16 in the mixing head body 12, the material of the sleeve 42 radially yields to accommodate such misalignment, whereby the second plunger 32 escapes injury. The self-lubricating property of the preferred sleeve material "ERTALON LFX" further acts to reduce the frictional resistance experienced by the second plunger 32 as it reciprocates within the sleeve 42. And, the destructive upward flow of reactive material and, hence, the packing of the groove 54 containing the second plunger's lip seal 56 is substantially avoided, thereby significantly reducing the likelihood of that the mix product will be contaminated by hydraulic fluid leaking from the second plunger's hydraulic actuator 34.

In accordance with another feature of the instant invention, the mixing head 10 also provides nonyieldable bearing surfaces 58 for the second plunger 32 within the hydraulic actuator 34 therefor on the "wet" side of its lip seal 56. The bearing surfaces 58 permit a reduction in the length of the quieting chamber which must be defined by the metallic second bore 16, thereby reducing the length of the quieting chamber upon which reactive material may still accrete.

Referring once again to FIG. 2, a radially-inward annular flange 60 on the nozzle member 48 serves to retain the sleeve 42 therein, thereby preventing the axial cold flow of the sleeve material during normal operation of the mixing head 10. Specifically, the annular flange 60 engages a complementary annular seat 62 on the sleeve 42 to provide axial support therefor while maintaining the presence of the sleeve material at the outlet end 18 of the quieting chamber. It will be readily appreciated that the axial support for the sleeve 42 afforded by the annular flange 60 becomes increasingly important as the yield strength of the sleeve material decreases, as where the preferred material "ERTALON LFX" is replaced with a relatively softer material such as glass-filled polytetrafluoroethylene. In this regard, it is also noted that the wall thickness of the sleeve 42 must be sufficient to prevent the axial compression thereof when the nozzle member 48 encompassing same is secured to the mixing head body 12, as axial compression of the sleeve 42 is likely to result in a radial contraction thereof with an attendant increase in the frictional contact experienced between the second plunger 32 and the inner surface 40 of the sleeve 42.

The instant mixing head 10 further includes a third bore 64 in the mixing head body 12 intersecting with the second bore 16 therein for introducing fillers into the mix product stream prior to its exiting the quieting chamber. A plug 66 seals the third bore 64 absent the use of such fillers.

While the preferred embodiment of the invention has been disclosed, it should be appreciated that the invention is susceptible of modification without departing from the spirit of the invention or the scope of the subjoined claims.

I claim:

1. A mixing head for a reaction injection molding apparatus comprising
    a body formed of a first material having a first and a second cylindrical chamber defined therein, an end of said first chamber intersecting with said second chamber, said second chamber having an outlet end;
    a plurality of injection nozzles in communication with said first chamber for injecting reactive molding components into said first chamber;
    a first and a second plunger controllably reciprocable within said first and second chambers, respectively, to eject said injected components from said first chamber into said second chamber, and from said second chamber out said outlet end thereof, respectively, said second plunger being formed of a second material; and
    a sacrificial sleeve having an inner surface defining at least a portion of said second chamber proximate to said outlet end thereof, wherein said sleeve is formed of a third material having a yield strength less than that of said first and second materials of said body and said second plunger, respectively, and said third material of said sleeve plastically deforms to permit continuing reciprocation of said second plunger relative to said inner surface of said sleeve.

2. The mixing head of claim 1 wherein said third material of said sleeve has a yield strength ranging between about 5,000 psi and about 20,000 psi, a nonexternally-lubricated dynamic coefficient of friction with the material of said second plunger of less than about 0.25, and a notched impact strength greater than about 0.5 ft-lbs as defined by Charpy test.

3. The mixing head of claim 1 wherein said third material of said sleeve is a Type 6 polyamide.

4. The mixing head of claim 1 wherein said third material of said sleeve is chemically nonreactive with and nonadherent to said individual injected components and mixtures thereof.

5. The mixing head of claim 1 wherein said sleeve defines said outlet end of said second chamber.

6. The mixing head of claim 1 including flange means on said body for preventing axial cold-flow of said third material of said sleeve upon reciprocation of said second plunger within said second chamber.

7. In a mixing head for a reaction injection molding apparatus including
    a body formed of a first material having a first bore therein defining a first chamber, and a second bore therein intersecting with said first bore and defining a second chamber, said second chamber having an outlet end;
    a plurality of injection nozzles in communication with said first chamber for injecting reactive molding components into said first chamber;
    a first plunger reciprocable in said first bore between a retracted position wherein an end of said first plunger is withdrawn past said injection nozzles to permit injection of said reactive molding components into said first chamber, and an extended position wherein said first plunger blocks said injection nozzles while the end of said first plunger ejects said injected components from said first chamber into said second chamber;
    a second plunger formed of a second material reciprocable in said second bore between a retracted position wherein an end of said second plunger is withdrawn past the intersection of said first bore with said second bore to permit said injected components to flow from said first chamber into said second chamber, and an extended position wherein said second plunger blocks said first bore while the end thereof ejects said injected components in said second chamber out said outlet end thereof;
the improvement wherein
    said outlet end of said second chamber is lined with a sacrificial sleeve fixedly attached to said body, wherein said sleeve is formed of a third material having a yield strength less than that of said first and second materials of said body and said second plunger, respectively, and said third material of said sleeve plastically deforms to permit continuing reciprocation of said second plunger within said second chamber.

8. The mixing head of claim 7 wherein said third material of said sleeve has a yield strength ranging between about 5,000 psi and about 20,000 psi, a nonexternally-lubricated dynamic coefficient of friction with the material of said second plunger of less than about 0.25, and a notched impact strength greater than about 0.5 ft-lbs as defined by Charpy test.

9. The mixing head of claim 7 wherein said third material of said sleeve is a Type 6 polyamide.

10. The mixing head of claim 7 wherein said third material of said sleeve is chemically nonreactive with and nonadherent to said individual injected components and mixtures thereof.

11. The mixing head of claim 7 wherein said sleeve is disposed in a counterbored portion of said second bore.

12. The mixing head of claim 7 including flange means on said body for preventing cold flow of said third material of said sleeve axially of said outlet end of said second chamber.

13. The mixing head of claim 7 including a third bore in said body intersecting with said second bore therein for introducing filler materials into said second chamber.

* * * * *